United States Patent [19]

Heisler

[11] 4,344,522

[45] Aug. 17, 1982

[54] APPARATUS FOR SENSING, ORIENTATING AND DELIVERING CANS TO SUBSEQUENT CONVEYOR

[76] Inventor: Raymond A. Heisler, 657 Dakota Trail, Franklin Lakes, N.J. 07417

[21] Appl. No.: 153,069

[22] Filed: May 27, 1980

[51] Int. Cl.³ .............................................. B65G 47/26
[52] U.S. Cl. .................................. 198/419; 198/420; 198/425; 198/437; 198/447
[58] Field of Search ............... 198/419, 420, 425, 437, 198/442, 447, 452, 492; 53/499, 543, 544

[56] References Cited

U.S. PATENT DOCUMENTS

| | | | |
|---|---|---|---|
| 2,771,177 | 11/1956 | Cutter et al. | 198/492 X |
| 3,142,948 | 8/1964 | Arnett | 53/499 X |
| 3,209,512 | 10/1965 | Ferguson, Jr. et al. | 53/544 X |
| 3,289,810 | 12/1966 | Iannucci | 53/544 X |
| 3,462,912 | 8/1969 | Anderson | 198/442 |
| 3,848,394 | 11/1974 | Heisler | 198/442 X |
| 4,037,711 | 7/1977 | Heisler | 198/452 |

Primary Examiner—Jeffrey V. Nase
Attorney, Agent, or Firm—Ralph R. Roberts

[57] ABSTRACT

A conveying system for bailed containers receives said containers after bail-application and with the bails supported in a substantially vertical manner advances the containers to and through a turning station. The container is first detected as to its presence on a conveyor belt and then by electric eye means a spot on the container is "read". If the spot is on the desired side no turning is performed but if the spot is detected on the opposite side the container is turned by raising a turning rail that engages the bottom rim of a container and causes the container to turn a half revolution. During turning the bail is maintained in an upright position by a magnet bar. The conveyors also may deliver bailed containers to a merge and stop unit having flow control means for delivering these containers in timed array to further processing, such as packaging.

5 Claims, 9 Drawing Figures

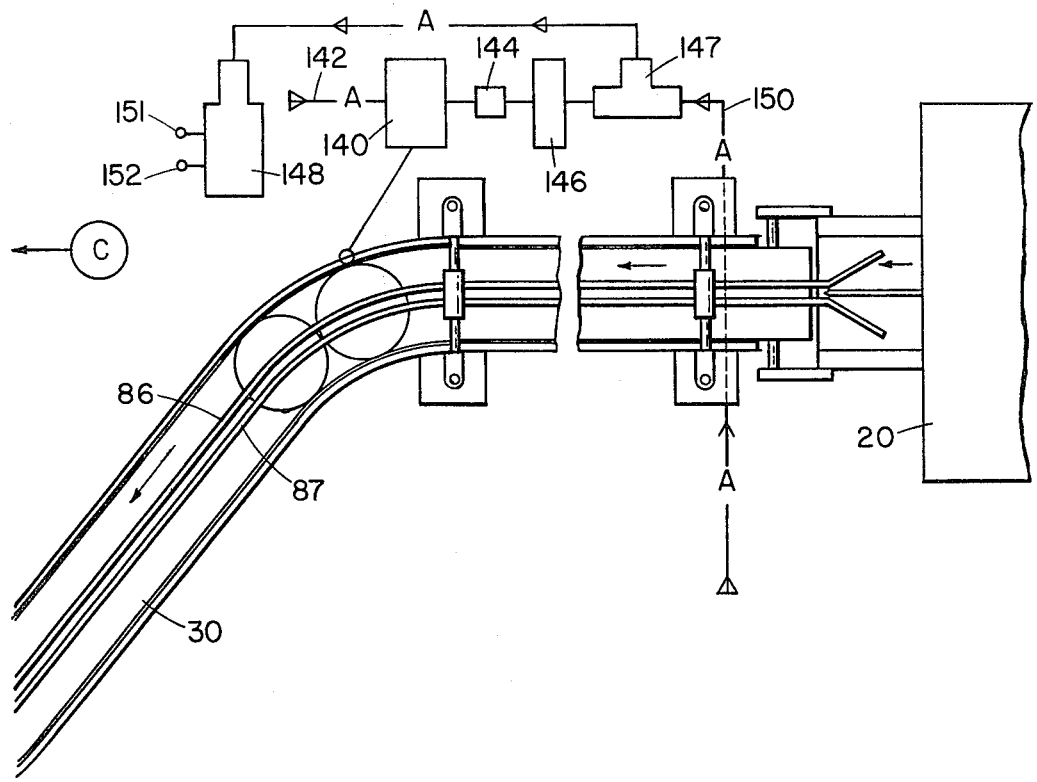
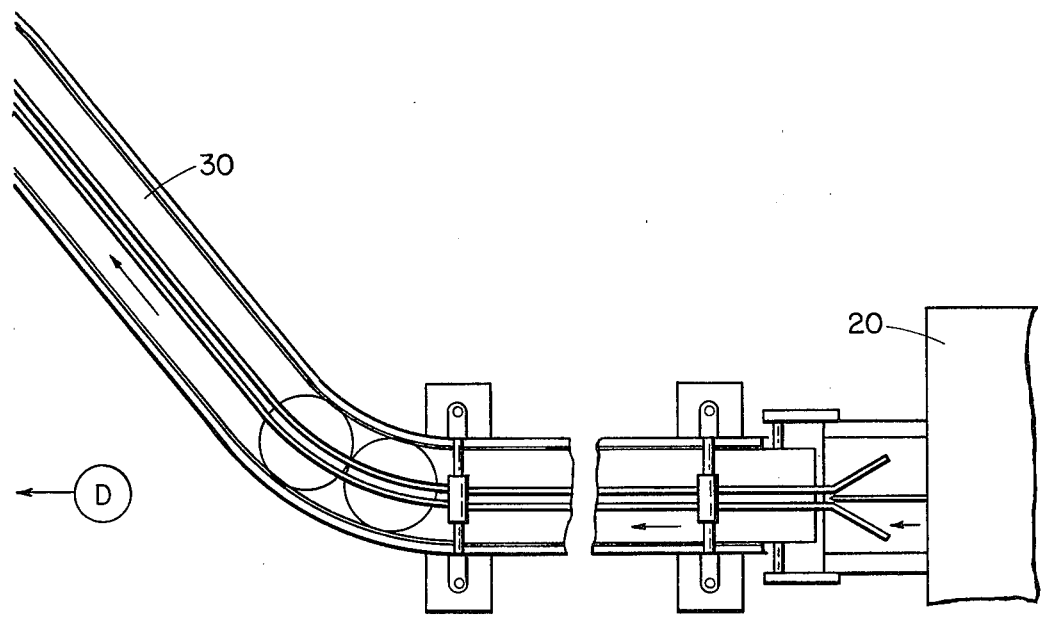
Fig. 7

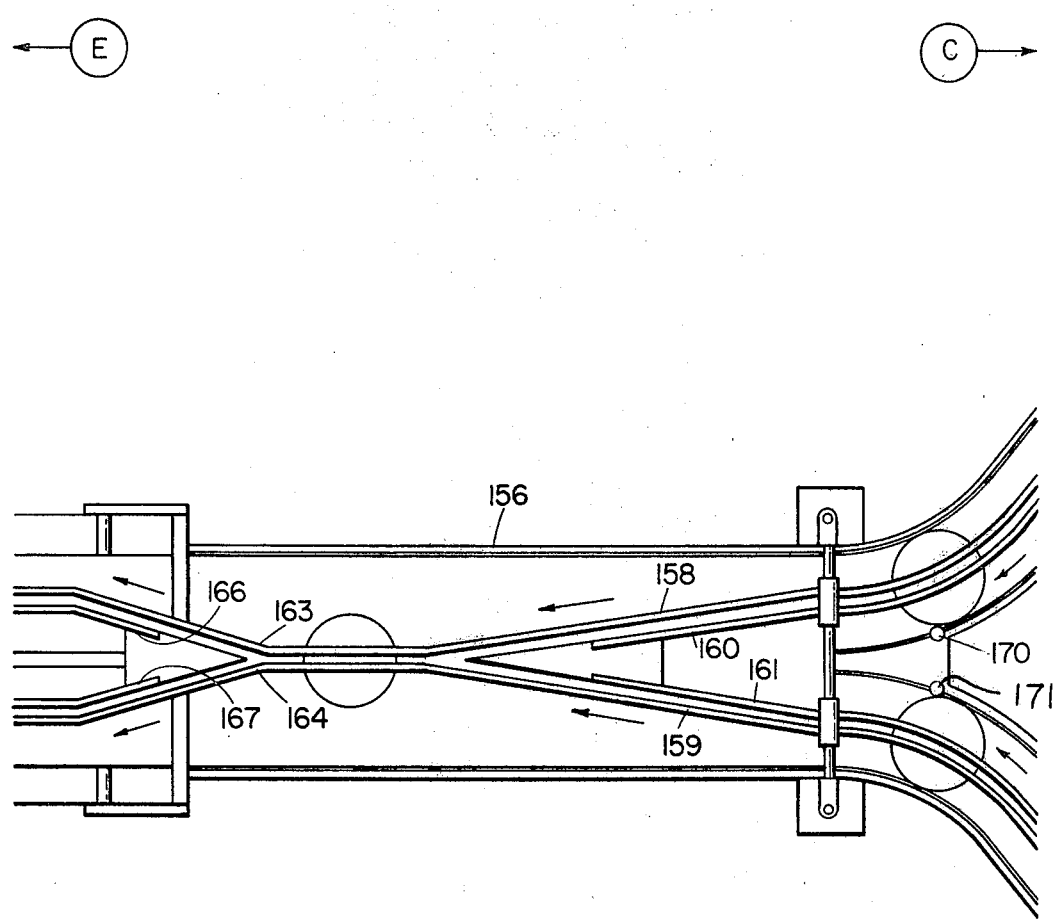
Fig. 8

APPARATUS FOR SENSING, ORIENTATING AND DELIVERING CANS TO SUBSEQUENT CONVEYOR

BACKGROUND OF THE INVENTION

1. Field of the Invention

With reference to the classification of art as established in and by the U.S. Patent Office the present invention is believed to be found in the general class entitled, "Conveyors, Power Driven" (Class 198) and the several subclasses therein and entitled, "Conveyor for Changing Attitude of Item Relative to Conveyed Direction" (subclass 373) and the further subclass entitled, "by conveying randomly faced items and turning items to uniform facing" (subclass 382) and in the subclass thereunder entitled, "by conveying an item that has a position characteristic and rotating the item until it is positioned" (subclass 394) and in the subclass entitled "with control means actuated in response to sensing of improperly faced item" (subclass 395) and in the subclass entitled, "by turning only improperly faced items to uniform facing" (subclass 399).

2. Description of the Prior Art

The turning of a container or can as it is moved forwardly is not new and is often done accidently or deliberately. In the advancing of containers with bails it is often desirable that the can or container be positioned in and with a determined attitude for the placing of a label on the container. The placing of a label or positioning of a can or container is often in conjunction with the placing of the can or container in a carton. These cans or containers are most often precisely positioned for insertion into an erected carton. The rotation of an eared container is shown in my U.S. Pat. No. 3,241,578 as issued Mar. 22, 1966. Forming and filling of a carton by eared and bailed containers was shown in my U.S. Pat. No. 3,848,394 as issued Nov. 19, 1974 and in related patents.

The several patents and the classification of art in powered conveyors provide ample indications that the rotating of an eared container is neither a new or unusual requirement. The present apparatus, to be more fully described hereinafter, carries the eared container to a rotating apparatus at a given distance from apparatus for applying a bail. The apparatus in this patent application is adapted to ascertain the presence of a bail and that said bail is properly applied, after which the desired orientation of the container is determined by an electric eye. Those containers that are in the desired position are delivered to further operations, such as label application, after which the bailed and labeled container is delivered to a case packer or the like.

SUMMARY OF THE INVENTION

This invention may be summarized, at least in part, with reference to its objects. It is an object of this invention to provide, and it does provide, apparatus for receiving and ascertaining the presence of a properly bailed container and after this determination has been made to "read" a spot on the container and to rotate only those containers that are not orientated in a desired position. After delivering the containers in a desired position or attitude a label may be applied after which the bailed and labeled containers are delivered to a feeding gate from which the containers are delivered one-at-a-time to conveying means for accumulation for apparatus such as a case packer.

It is a further object of this invention to provide, and it does provide, a powered conveyor with plate-like members on which a bailed container is advanced to photocell means where the the presence or absence of a properly bailed container is ascertained. The bailed container is now "read" as to the presence or absence of a spot on the container at the desired attitude. If and when the container is in the desired location the container is fed to later operations, if the container is to be turned to the desired attitude the guide rails which maintain the bails in an upright condition are discontinued and with the bailed container and attached bail are maintained in an upright condition by a bar magnet. The container, when rotation is required, is turned by engaging the rim with a raised rail on the edge of the conveyor which rail causes a turning of the container. The bail is then reengaged and maintained in an upright condition during further operations.

In brief, the present apparatus is contemplated to be used with bailed containers such as gallon cans of paint and the like. The bail is applied to a container and with the bail in an upright condition said container is carried forwardly to an inspecting length of plate type conveyor. Said container is first inspected for a determined attachment of the bail and after ascertaining the proper attachment and presence the container is then examined for a desired orientation. Photocells are utilized to "read" the desired orientation of the container. If the container is in the desired position the bailed container is advanced on the plate conveyor to an operation such as labeling. At and after this station the bailed container is delivered to a gate control whereby containers are delivered one-at-a-time to a conveyor for feeding and positioning the bailed containers in a cartoning apparatus. When the bailed container needs to be turned to a desired orientation the "read" spot sends a signal to a lift rail which is raised to engage the rim of the container and as and with the advancement of the container it is rotated. The bail is retained in an upright condition by a magnet bar. The rotation is sufficient for the bailed container to rotate one hundred and eighty degrees. With the desired rotation the container proceeds as above. The gate control, as hereby more fully described, provides for a controlled feeding of containers to a cartoning apparatus. The supply of bailed containers may be a demand delivery from one or more bail applying mechanisms such as is described in the above identified U.S. Pat. No. 3,241,578.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen a specific embodiment of the container turning apparatus and merge control as adopted for use with containers with attached bails and showing a preferred means of actuation. This specific embodiment has been chosen for the purposes of illustration and description as shown in the accompanying drawings wherein:

BRIEF DESCRIPTION OF THE DRAWINGS

FIG. 7 represents a fragmentary plan view portion in a reduced scale and showing a conveyor system for two bail-applying mechanisms with two delivery conveyors leading to a single case packer which is actuated to shut down the bail-applying mechanism when containers fill the conveyor sufficiently to actuate the valve;

FIG. 8 represents a fragmentary plan view of a portion of the conveyor line of FIG. 7.

In the following description and in the claims various details are identified by specific names for convenience. These names are intended to be generic in their application. Corresponding reference characters refer to like members throughout the several figures of the drawings.

Figure 1:
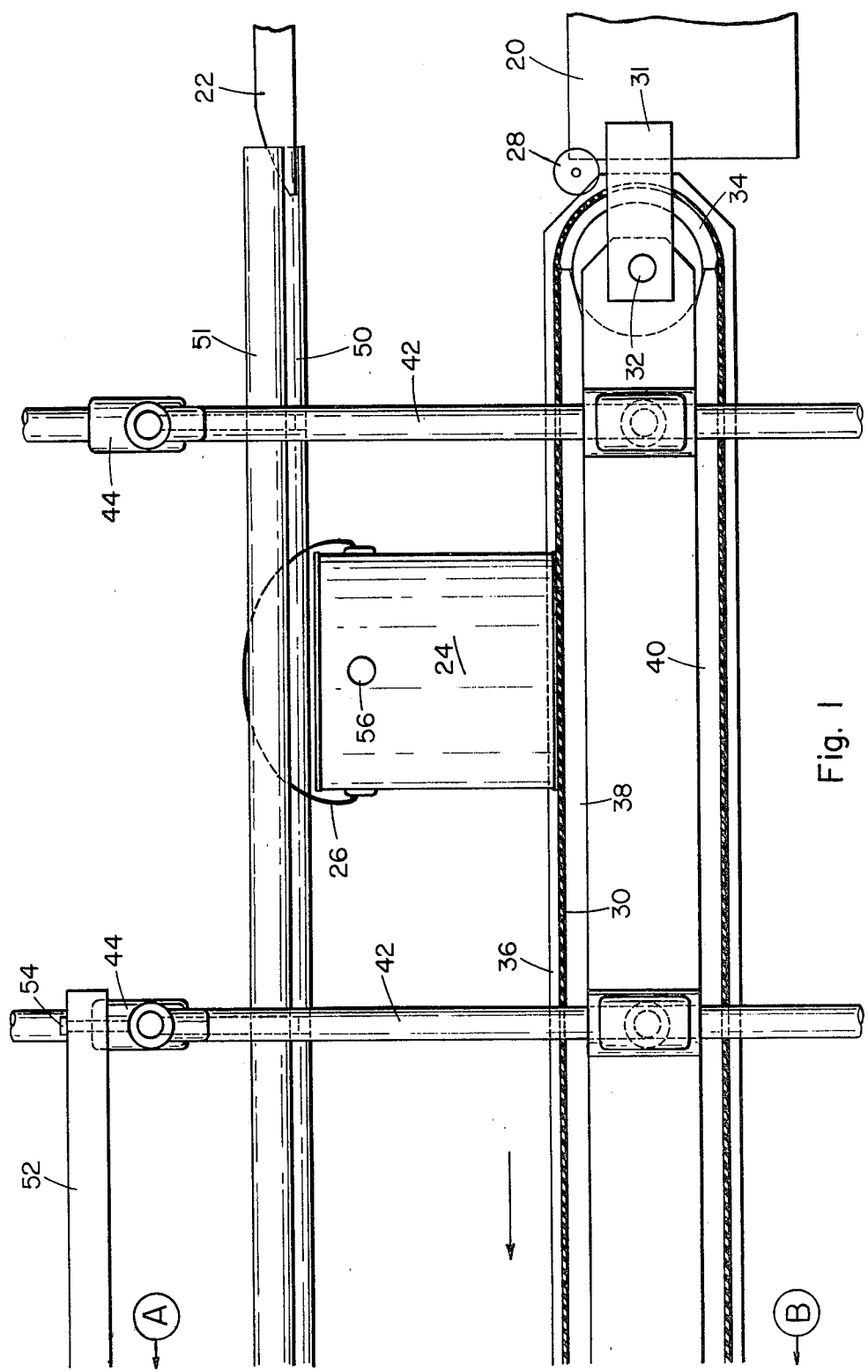
FIG. 1 represents a side view, partly diagrammatic, of a portion of the conveyor means immediately downstream of a bail-applying apparatus.
Figure 2:
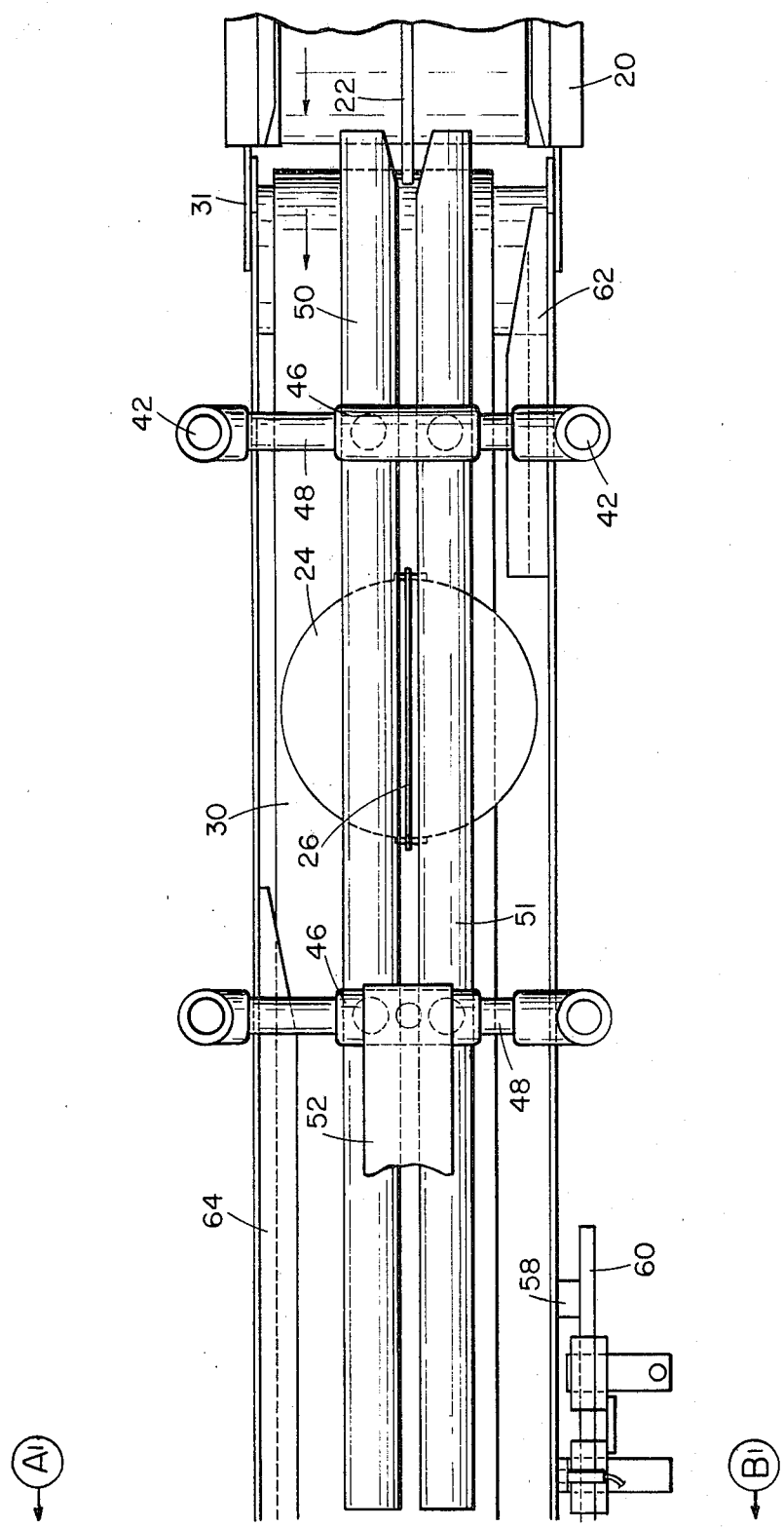
FIG. 2 represents a top or plan view of the portion of the conveyor means of FIG. 1.

CONTAINER DELIVERY APPARATUS OF FIGS. 1 and 2

The drawings and the FIGS. therein depict a conveying delivery system that is generally between a bail-applying mechanism and a case packing apparatus. The bail-applying apparatus is shown in applicant's U.S. Pat. No. 3,241,578 above identified. The case packing apparatus is shown in applicant's U.S. Pat. No. 3,848,394 also above identified. The bail-applying apparatus is actuated on a demand basis. In other words, the apparatus applies a bail to a presented container when and as an eared container is brought to a bail-applying position in apparatus in which the output thereof is identified as 20 (FIG. 7).

A blade member 22 is carried by this mechanism and a container 24 having an applied wire bail 26 is delivered to and advanced by a conveyor means in the downstream portion of this apparatus. A transfer roller 28 is diagrammatically indicated at the discharge end of this mechanism or apparatus 20. The container 24 is moved onto a conveyor belt 30 which is usually a plate-type of conveyor. A bracket 31 is used to space and align the bail-applying apparatus 20 with a head shaft 32. A side guide 36 is diagrammatically shown at the far side. A support guide 38 is shown carrying the upper extent of conveyor belt 30. A like guide 40 is shown for the bottom extent of the belt 30.

Upright pipe supports 42 carry and have T-connectors 44 that are fitted to the pipe supports 42. These T-connectors are fixed at the desired positions. Midway between the uprights and connectors are pipe connectors 46 which engage pipe portions 48. The bail 26 on each advanced and transported container 24 is retained in an upright and aligned condition as in FIG. 1 by guide rails 50 and 51 carried below and by transverse pipe connectors 46. These same upright pipe supports 42 carry the support and guides 38 and 40 for the conveyor belt 30. The left portion of FIGS. 1 and 2 show pipe supports 42 carrying the right end of an upper support bar 52. A bolt or cap screw 54 for retaining the bar 52 is also indicated.

The container 24 of FIG. 1 is shown with an indicating spot or dot 56 which is "read" by photoelectric eye means to be later identified. These eye devices are carried by and on a bracket 58 and bar 60 as indicated in FIG. 2. Also shown in this plan view is a short, side guide plate means 62 and on the opposite side and at a downstream position on this conveyor is a long guide plate 64. It is to be noted that the bail guide members 50 and 51 have their entering ends formed with guide chamfers so that the bail is supported and the container is maintained with the bail substantially aligned with the flow direction of the conveyor.

CONTAINER APPARATUS AS SHOWN IN FIGS. 3 AND 4

Figure 3:
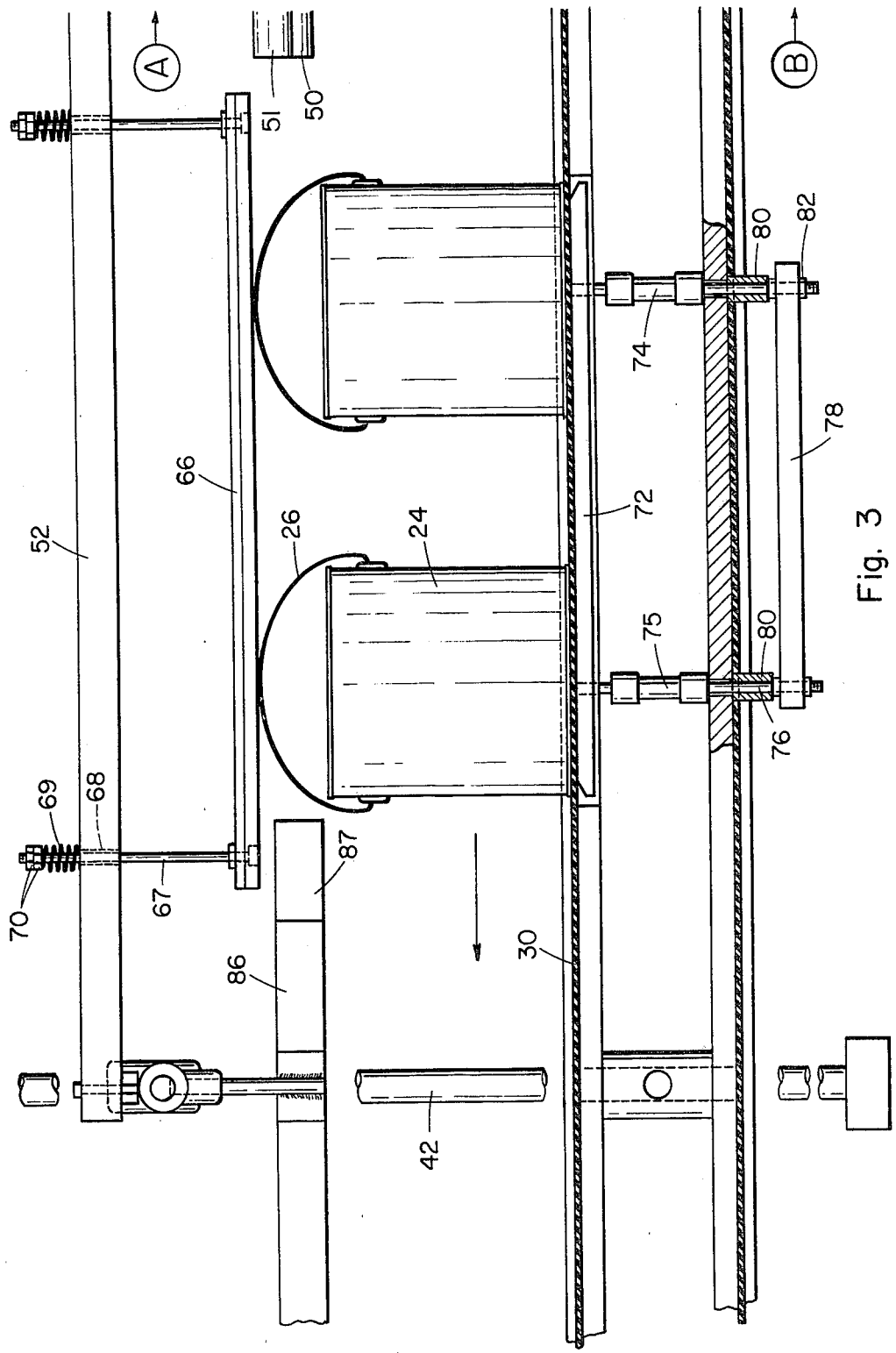
FIG. 3 represents a side view, partly diagrammatic, of another portion of the conveyor means immediately adjacent to and downstream of the section shown in FIG. 1.
Figure 4:
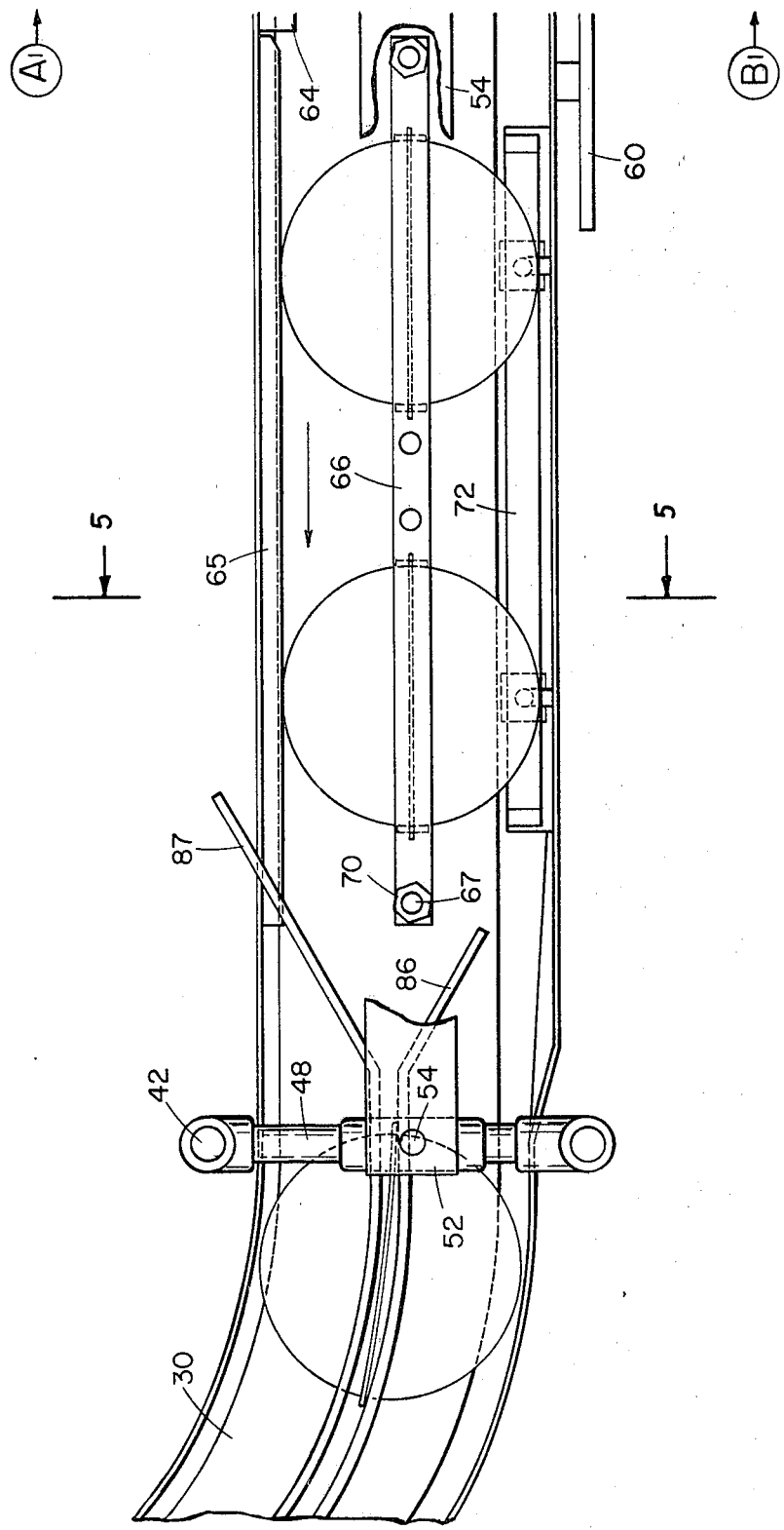
FIG. 4 represents a top or plan view of the portion of the conveyor means of FIG. 3.
Figure 5:
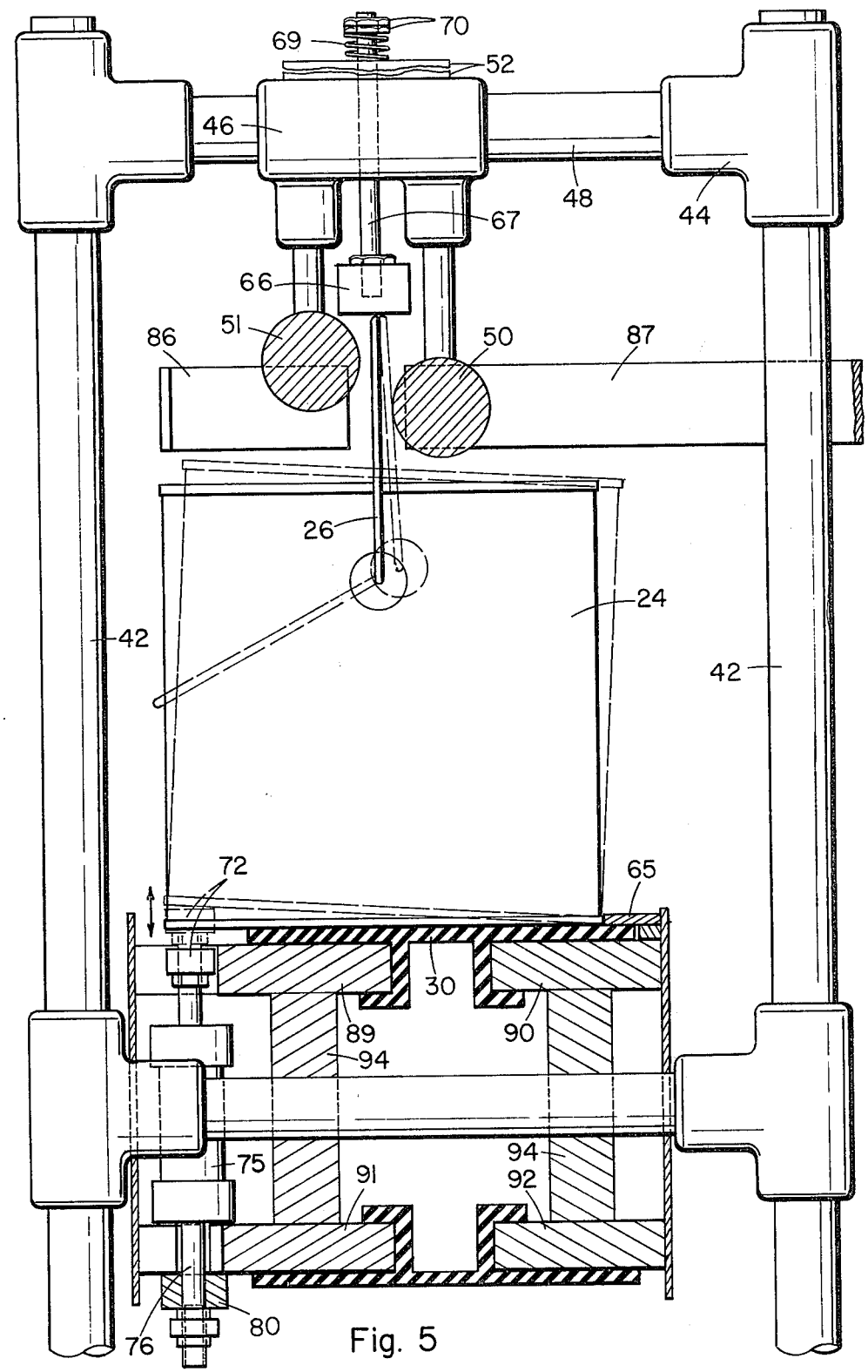
FIG. 5 represents a transverse view of the conveyor means and in an enlarged scale showing in particular the lift rail apparatus as shown in FIGS. 3 and 4, this view taken on the line 5—5 of FIG. 4 and looking in the direction of the arrows.

In FIGS. 3 and 4 there is diagrammatically shown the bailed container 24 advanced to the turning station. It is to be noted that the turning of the bailed container 24 about one hundred eighty degrees or one-half revolution is made only when the container is *not* in the desired orientation. The signal for turning is discussed with relation to the circuit of FIG. 6. As shown in FIGS. 3 and 4, the conveyor belt 30 continues from the showing in FIGS. 1 and 2. Upright pipe support 42 is like that described above. Support bar 52 is carried by these pipe supports and at a selected intermediate location a magnet bar 66, carried by bolts 67, is suspended below this support bar. Each bolt 67 is slidable upwardly in a formed aperture 68 in said support bar. A spring 69 is carried on the upper side of this bar and by means of nuts 70 the magnet bar 66 is supported at a determined height above the conveyor belt. Guide rail 65 as shown in FIG. 4 provides a continuation of the guide plate 64 as depicted in FIG. 2, above described.

Diagrammatically shown in both FIGS. 3 and 4 is a pneumatically actuated and lifted turning rail 72. Pneumatic cylinders 74 and 75 are adapted to lift said rail when a signal is sent to valve means associated with a supply of pressurized air. The cylinders 74 and 75 are secured at their lower ends to the conveyor support structure shown and described hereinafter. Spacer bar 78 is secured to the end of each cylinder rod 76 which are slidable in bushings 80. Nuts 82 retain rods 76 to bar 78 which insures a like up and down movement of the now coupled cylinders 74 and 75 as they raise and lower turning rail 72.

Shown in FIGS. 3 and 4 is a bail guide that engages and insures that a container turned one-half revolution is advanced with its bail in an upright condition. After a turning has been completed or a non-turning advance has been made, the wire bail 26, which has been held in an upward indicated position by magnet bar 66, is then advanced to a curved conveying portion. Bail engaging guides 86 and 87 engage the bail and carry the container 24 and upright bail 26 to further operations. The curved guides are made to suit the particular conditions of the case packer delivery.

TRANSVERSE VIEW OF FIG. 5

The transverse view taken on the line 5—5 of FIG. 4 is partly diagrammatic but is illustrative of the action and later forward movement on the conveyor. The conveyor belt 30 is depicted as a plate-type conveyor slidable on upper support plates 89 and 90. A guide rail 64 is disposed to engage and retain the lower rim of the container 24. Lower slide support plates 91 and 92 carry the return extent of the conveyor 30. The upper and lower support plates 89, 90, 91 and 92 are spaced and supported by members 94 seen in this FIG. The container 24 is shown both in a level condition and in a tilted condition in dashed outline. The tilt condition occurs when the pneumatic cylinders 74 and 75 are actuated to lift turning rail 72 upwardly. The depicted bail guides 86 and 87 may be circular in configuration or other formed members. These guides are carried by supports 48 carried by T-connectors 44 and pipe members 46 as above described.

OPERATIONAL CIRCUIT AS IN FIG. 6

This circuit diagram indicates the preferred sequence of operations for a container. A container 24 is advanced on a conveyor belt 30. An electronic circuit control 95 first senses or ascertains the presence of a container on the belt. Detecting means 96 and 97 feed a signal to this control 95 to inform this circuit that a container 24 is in way of the detection means. A short distance upstream from detectors 96 and 97 are electric eye means 98 and 99. Although upstream from the detectors 96 and 97 these eyes 98 and 99 are actually actuated in response to the interruption of a beam from 96 to 97. The advancing container 24 breaks this beam which sends a signal to the circuit control 95 that a container is now on the belt 30 and has advanced to this point. The electric eyes 98 and 99 are now actuated and read a spot on the container. When the spot is "read" the presence or absence of said spot indicates that the container may need to be turned one hundred eighty degrees (one-half revolution). The turning rail 72 is then raised by pneumatic cylinders 74 and 75.

Pressurized air at about one hundred PSI is fed through conductor 100 to and through a filter 101, a pressure regulator 102, where the pressure is dropped to about seventy PSI. From this regulator the air is now fed through a lubricator 104 to a conductor 105. A four way connector 106 carries the pressurized air to conductors 108, 109 and 110. The air flowing through conductor 108 is sent to a can turning apparatus on the opposite conveyor not shown, but an exact duplicate thereof. The pressureized air fed to and through conductor 110 is received by another four-way connector 111. The output from connector 111 is to and through a conductor 114 which carries pressurized air to like opposite apparatus or can turning apparatus. The connector 111 also has a conductor 115 leading to a four-way valve 116. Another conductor 117 carries pressurized air to a three-way connector 118.

The three-way connector 118 carries pressurized air through conductor 120 to the opposite can turning apparatus, not shown. Pressurized air is also fed through conductor 121 to a solenoid valve 122. Signals from the control circuit in box 95 are received through wires 123 and 124. When the spot being "read" determines that a can or container 24 is to be turned, pressurized air is fed to and through conductor 125 to a setting pilot for "up" actuation on four-way valve 116. The "up" pressurized air is fed through conductor 127 to cause cylinders 74 and 75 to raise turning bar 72.

When and as the turning bar 72 is raised by the cylinders 74 and 75 the advancing container 24 is brought in way of a small sensing valve 128 which is opened to cause a drop of pressurized air in line or conductor 129. This drop in air pressure causes a pilot valve 130 to be actuated and a signal sent through this valve to a pulse control valve 131. This pressurized air signal causes the down pilot of four-way valve 116 to be set so that pressurized air is sent through conductor 132 to the top portions of cylinders 74 and 75 to cause them to lower turning rail 72. A T-connector 133 feeds pressurized air to the input side of a needle valve 134 and thence through conductor 135 to a T-connector 136.

USE AND OPERATION OF CIRCUIT OF FIG. 6

Figure 6:
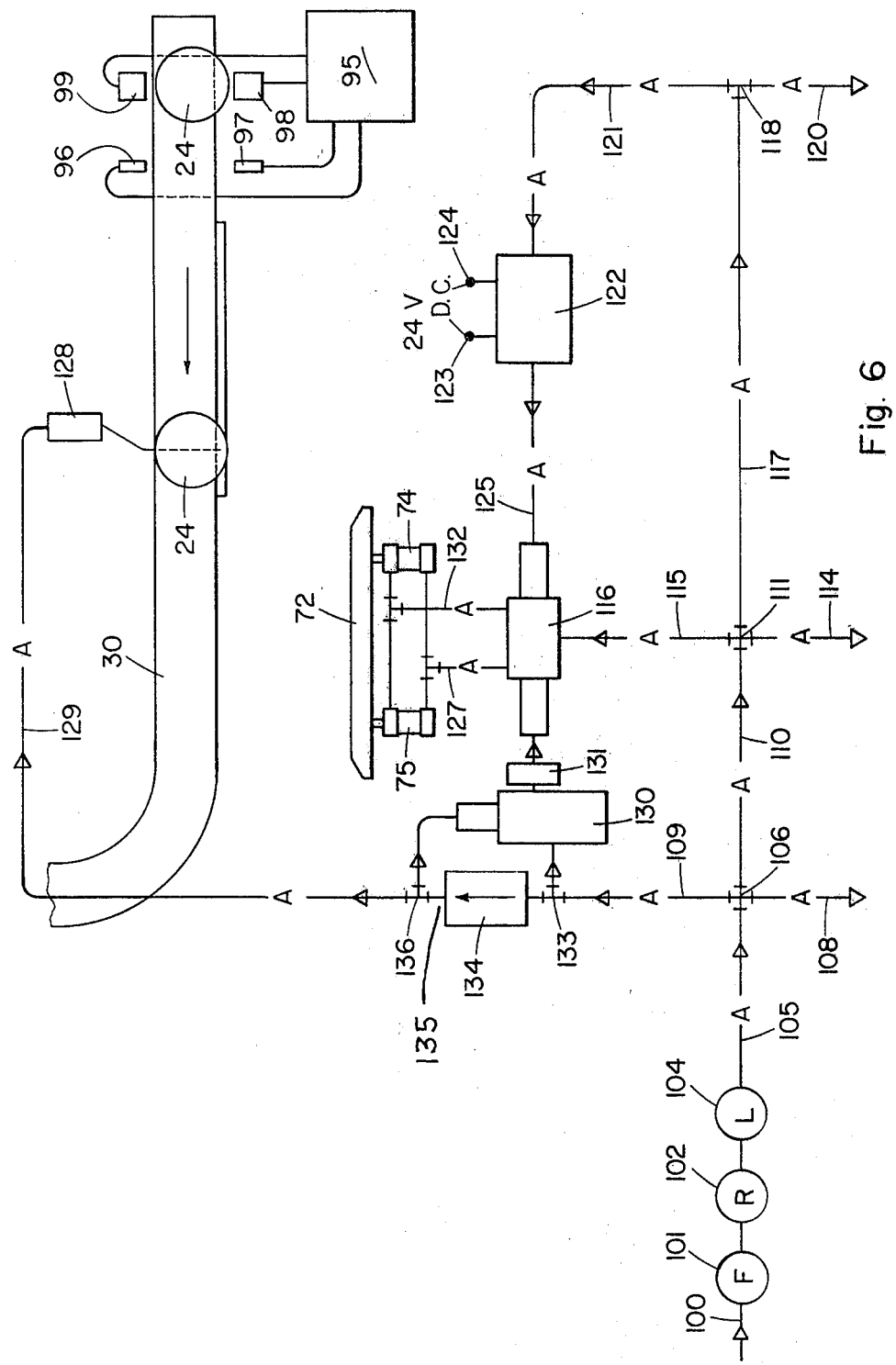
FIG. 6 represents a partly schematic and partly diagrammatic circuit diagram of the can inspecting and turning apparatus.

The circuit diagram of FIG. 6 discloses the preferred arrangement of the can or container turning circuit for only one conveyor. This circuit is duplicated when two conveyors are utilized, such as the conveyor system of FIG. 7, to be hereinafter more fully discussed. A bailed container is delivered to the conveyor belt 30 and is advanced until elastic eye means 96 and 97 are reached.

The beam between eye means 96 and 97 is "cut" by the advancing container which sends a signal to the electronic control 95. With the presence of a container now ascertained, electric eyes 98 and 99 are actuated. The "spot" 56 is toward one side or the other of the advancing conveyor. This spot usually determines the presence of a construction seam. If the container is not to be turned the turning bar 72 is not raised and a signal is not sent to solenoid valve 122. If the container is to be turned in response to a "reading" of the spot 56 on the wrong side of the conveyor a signal is sent to the solenoid valve 122 which moves the pilot through conductor 125 to cause cylinders 74 and 75 to raise turning rail 72. This bar remains raised until a container is brought in way of sensing valve 128. The signal sent from this valve causes the raised bar to be lowered. Since the container may be in contact with the sensor of valve 128 for a long duration of time, a pulse limiter valve 131 is used to actuate a pulse of air and to cause a lowering of the cylinders 74 and 75 to occur.

CONVEYOR SYSTEM OF FIGS. 7, 8 AND 9

Figure 9:
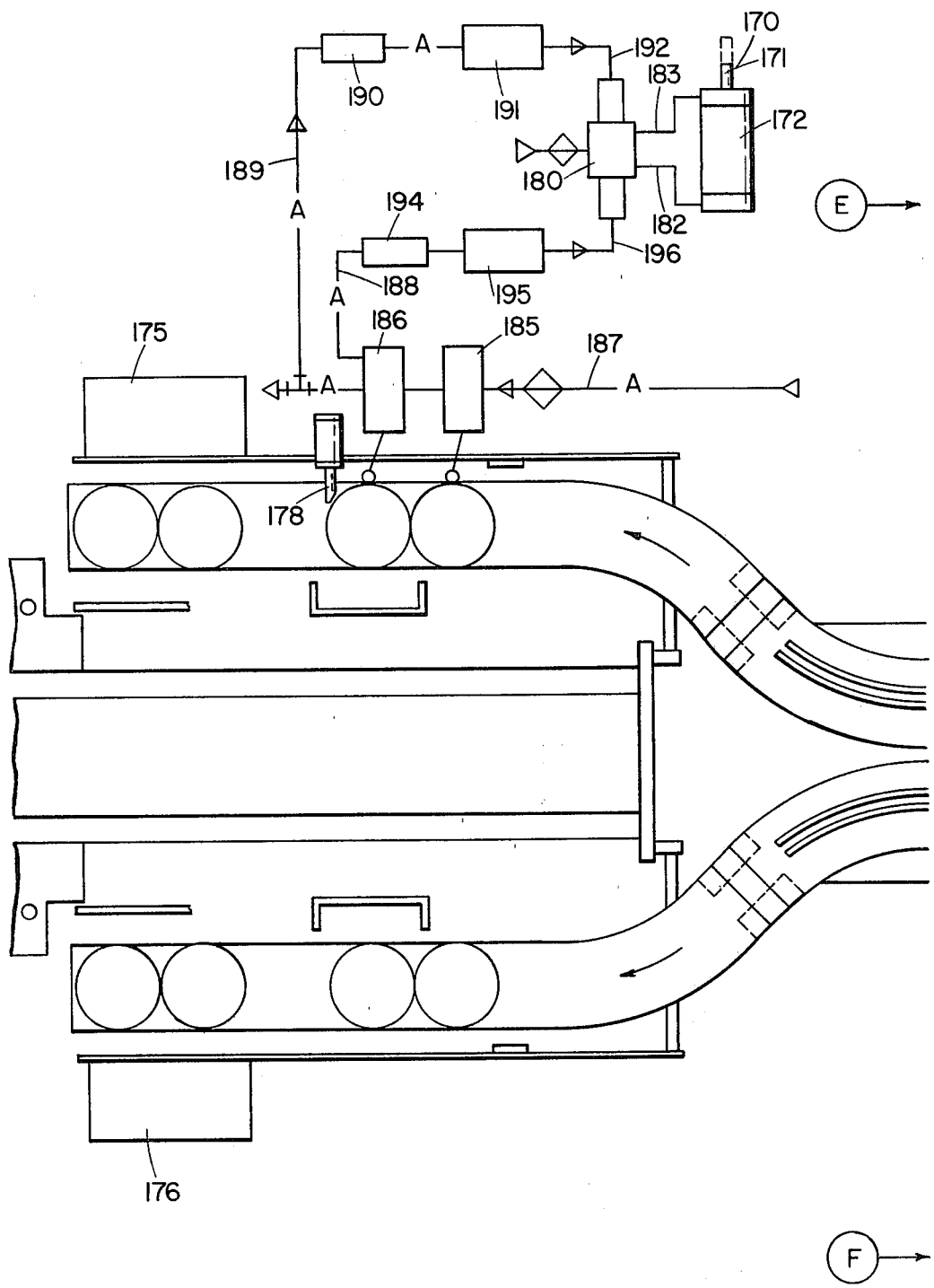
FIG. 9 represents a fragmentary plan view portion of the conveyor system of FIG. 8 and looking further downstream with the case packer of the containers, this view also showing a partly schematic and partly diagrammatic circuit and showing the cylinders that employ the feed control of the bailed containers.

Referring next and finally to FIGS. 7, 8 and 9, there is depicted a conveyor system for two bailing machines. These containers are carried to a merge conveyor and thence to a case packer above discussed. In FIG. 7 there are two bail-applying apparatus 20. Bailed containers 24 are fed to and onto plate-type conveyor belts 30. This FIG. shows a straight section of conveyor immediately downstream from the bailing machines. Where can or container turning is not required this section can be made without the turning apparatus and circuits of FIGS. 1 through 6. With or without the turning, the circuits and operation of FIGS. 7, 8 and 9 are used for a case packer having the capabilities of the reference patent.

With or without turning, the bailed container with the bail 26 in an upright condition is fed to guide rails 86 and 87. The bailed containers 24 are advanced by the conveyors in the direction indicated by the arrows. Since the bail-applying mechanism is on a demand basis, the feeding of the containers is not necessarily alternate. The containers approach and pass through a merge apparatus as seen in FIG. 8. The bailed containers may be delivered at a faster or slower pace than the pace of the case packer or for other reasons one or both conveyors may be filled with bailed containers until they back up to the signal valve 140 shown as engaging the outer diameter of a bailed container 24 at the beginning of the curve in the conveyor.

In the circuit diagram low pressure air is delivered through conductor 142 to the signal valve 140. A regulator or reducing valve 144 is shown as adjacent to the valve 140. A small storage tank 146 carries a small supply of pressurized air to T-connectors 147 then to a pressure switch 148 which is supplied by pressurized air through conductor 150 which may carry a "shut down" signal from the other conveyor. This electrical signal is fed through wires 151 and 152 to the bail-applying apparatus which is then shut down as having too many bailed containers on the conveyor system. The lower conveyor has like signal valve 140, regulator valve 144 and small storage tank 146. A "shut down" signal from the opposite conveyor may be fed to the signal device through conductor 150.

CONVEYOR MERGE UNIT OF FIG. 8

In FIG. 8 there is depicted a merging of two conveyor supply systems into a single supply. As shown, bailed containers are fed on plate-type conveyors 30 to a merge and metering section generally identified as 156. The guide rails 86 and 87 have been continued to become outer guides 158 and 159 and inner guide members 160 and 161 carry the bail 26 of the bailed container in an upright manner to said merge section. The bailed container is fed single file to a metering apparatus, not shown, whereat every other container is fed to one conveyor and a like number of containers are fed to the other conveyor for delivery and insertion into a case packer as in the above identified patent. Said alternate feed is made by known means onto plate conveyors 30 and bail guides 163 and 164 are identified as outer guides while the inner guides are identified as 166 and 167.

The conveyor merge section is also utilized to space the bailed containers so that a prescribed number are fed to the case packer at a selected rate. It is very desirable that the containers be spaced when they are in single file array and are not jammed. As to be described, with reference to FIG. 9, it is to be noted that pins 170 and 171 are raised by a cylinder 172 to prevent further flow of bailed containers to the merge unit after a selected number of containers has been alternately fed to the conveyors and are accumulated. Cylinder 172, as seen in FIG. 9, lifts these pins 170 and 171 in a timed circuit later described.

CASE PACKER CONVEYOR AND CONTROL CIRCUIT OF FIG. 9

Referring next and finally to FIG. 9, it is to be noted that plate-type conveyors 30 carry the bailed containers 24 to inserting mechanism as shown in the identified patent. Plow or dirverting means, not shown, turn the bail inward or outward as desired. Label application is made in accordance with customer requirement and desire. Pushers 175 and 176 each place two containers into opposite sides of a carton not shown. Two containers 24, as shown on the upper conveyor, are prevented from advancing on conveyor 30 by a stop pin 178 controlled by a circuit provided by the case packer. In the circuit shown with the upper conveyor and also duplicated with the lower conveyor unwanted jams are prevented.

The depicted circuit shows that pressurized air at about eighty PSI is fed to a four-way pilot valve 180 and thence to an air cylinder 172 through conductors 182 and 183. As shown, two sensing valves 185 and 186 are fed pressurized air through an air conductor 187. If more containers are to be inserted more valves will be arranged in a series sequence. The second sensing valve 186 sends a signal to two conductors 188 and 189. The valves 185 and 186 are sensing valves that insure that the case packer and its circuit is operated in an efficient manner. Until two containers 24 are stopped by pin 178 on both the upper and lower conveyors the case packer does not release four bailed containers for further packing.

When the fill line of the conveyor to the right of pin 178 becomes loaded and the case packer is operating at the selected speed, a signal is sent that two containers are present. An adjustable valve 190 and tank 191 send a pneumatic signal through conductor 192 to the "up" pilot of valve 180 and the pins 170 and 171 as carried by cylinder 172 are moved in way of the advancing containers 24 to stop the flow and delivery of containers to the metering means. This timing control is adjusted to pace the flow of the case packer at the desired rate.

These same valves 185 and 186 are utilized to sense when there is an absence of containers on the conveyor. A signal is sent through an adjusting valve 194 and tank 195 through conductor 196 to the "down" pilot of valve 180. This timing circuit is easily adjusted to the speed of the case packer. The bailing machines may deliver bailed containers at faster or slower speeds than can be accommodated but the "up" movement of cylinder 172 insures that the conveyor system is not jammed. This jamming is particularly undesirable at the single row system of FIG. 8. When the containers are crowded thereon a jamming at the dirverting apparatus occurs so the above circuit is adjusted and regulated to provide a simple speed or flow regulation of the equipment with a minimum of attention.

The can or container turning apparatus of FIGS. 1 through 6 may be used with the power merge control of FIGS. 7 through 9. One system may be used without the other but the advantages of this combination enables the bail-applying mechanism to be used with a case packer and the labeling to be achieved at a determined position. By orientation, only one labeler for each case packer is required. In certain instances where two labels are required on each container because of language requirements (as in Canada) two labels may be applied while on only one line. With the can or container turning apparatus the placing of a label at a specific position is easily achieved.

It is to be noted that the turning apparatus shows the use of a magnet bar 66 to maintain the bail 26 in a vertical or nearly vertical condition during turning. Other means such as turning the container and then reelevating the bail or with an overhead conveyor with turnable supports may also be provided. It is only essential that the container be turned when required and that all containers be presented for labeling operation or the like with the bail lifted for unobstructed access to the side of the bailed container.

The conveyors are shown more-or-less as symetrical but the conveyor systems are made to suit each plant installation. Two or more bail-applying mechanisms may be employed for one case packer. The case packer may pack six-containers to a case or may load all containers from one side. No matter the arrangement, it is desirable that the bails be turned against the container in a preselected pattern so that unwanted wear of the label or difficulty in removal does not occur. Whatever the arrangement, the above described apparatus shows a container turning apparatus and a merge control that is adapted to apparatus in the above identified patents.

It is to be noted that the magnet bar 66 is suspended with a spring bias urging the bar to its bail engaging position. The use of springs 69 is merely an inexpensive manner of suspending this bar so that variations in bail configuration can and are accommodated. Resilient means such as rubber or small pneumatic cylinders may also be used. it is also to be noted that the turning rail 72 is shown as lifted by cylinders 74 and 75. This is not to preclude the lifting of this bar by electric means such as solenoids or cams moved by a motor or hydraulic means. The control of the several operations shown by pneumatic circuits is a safety factor as pneumatic or fluidic control is now so fool proof and accepted.

Terms such as "left", "right", "up", "down", "bottom", "top", "front", "back", "in", "out" and the like are applicable to the embodiments shown and described in conjunction with the drawings. These terms are merely for the purposes of description and do not necessarily apply to the position in which the container turning apparatus and merge control may be constructed or used.

While a particular embodiment of said apparatus, circuits and the like has been shown and described it is to be understood the invention is not limited thereto and protection is sought to the broadest extent the prior art allows.

What is claimed is:

1. A bailed container merge apparatus and stop means adapted to receive bailed containers with the affixed bails carried in a substantially vertical manner, said merge apparatus and stop means including:
    (a) means for advancing bailed containers from plural first conveyors and to merge these bailed containers into a single file array on a second conveyor whereat they are advanced;
    (b) metering apparatus for receiving the single file array of advancing containers carried on said second conveyor and alternately feeding these bailed containers to and onto a pair of like third conveyors and with each of said third conveyors travelling at substantially like speeds;
    (c) a timing circuit disposed to initiate a signal to a first pin, said first pin movable from a non-engaging condition to a condition where said first pin is moved so as to come in way of advancing bailed containers on an associated third conveyor, and means provided in and by said timing circuit to count and pass a determined number of bailed containers carried by said associated third conveyor and to move said first pin into impeding condition and position when a selected number of bailed containers have been passed and counted;
    (d) a series of sensing means each adapted to be actuated by the presence of a bailed container at a selected position on said associated third conveyor and upstream of said first pin;
    (e) circuit means adapted to "read" the presence of a bailed container at each of said sensing means and to evaluate the period of time in which the containers are in way of the associated sensing means, and after a selected duration of time an actuating signal is sent to a container stop means upstream of said second conveyor, the actuating signal causing the stop means to be actuated, and when the time duration is less than said selected duration the stop means is not actuated, and
    (f) a pair of second pins providing said container stop means, said pair of second pins arranged so that each is adapted to be brought in way of a lower rim of an advancing bailed container as said bailed container is advanced along said first conveyors while maintaining the attached bail in a substantially vertical attitude, this pair of second pins reciprocated from and in way of an advancing container and in response to the actuated signal from the circuit means.

2. A bailed container merge apparatus and stop means as in claim 1 in which the timing circuit for moving the first pin and to count and pass a determined number of bailed containers is adapted to pass two bailed containers to each of two like fourth conveyors associated with case packing said bailed containers.

3. A bailed container merge apparatus and stop means as in claim 2 in which the pair of second pins providing the stop means are each adapted to impede an effluent flow of bailed containers along one of the two converging first conveyors, each pin engaging said lower rim of a container while the opposite side of the rim is engaged by a side guide disposed on the opposite side of the same conveyor.

4. A bailed container merge apparatus and stop means as in claim 3 in which the two second pins of the stop means is carried and reciprocably moved by pneumatic means and the two pins are carried on and by a pneumatic cylinder actuated by pressurized air.

5. A bailed container merge apparatus and stop means as in claim 4 in which the pair of second pins are disposed to be reciprocably moved substantially vertically and simultaneously with a header member carried on and moved by said pneumatic cylinder.

* * * * *